United States Patent
Russ et al.

(10) Patent No.: US 11,184,761 B2
(45) Date of Patent: Nov. 23, 2021

(54) METHOD FOR OPERATING A WIRELESS TRANSMITTER AND A WIRELESS RECEIVER, AND SYSTEM

(71) Applicant: Andreas Stihl AG & Co. KG, Waiblingen (DE)

(72) Inventors: Patrick Russ, Stuttgart (DE); Tommy Roitsch, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 134 days.

(21) Appl. No.: 16/198,034

(22) Filed: Nov. 21, 2018

(65) Prior Publication Data
US 2019/0166487 A1 May 30, 2019

(30) Foreign Application Priority Data

Nov. 24, 2017 (EP) .................................. 17203567

(51) Int. Cl.
*H04W 8/24* (2009.01)
*G08C 17/02* (2006.01)
(Continued)

(52) U.S. Cl.
CPC ............. *H04W 8/24* (2013.01); *A47L 7/0095* (2013.01); *B23Q 11/0046* (2013.01);
(Continued)

(58) Field of Classification Search
CPC .... A47L 7/0095; A47L 9/2894; H04W 28/26; H04W 4/12; H04W 4/46; H04W 64/006; H04W 8/24
(Continued)

(56) References Cited

U.S. PATENT DOCUMENTS 6,079,506 A * 6/2000 Mercer ................. E21B 44/005
175/45
10,055,570 B2 8/2018 Tyson et al.
(Continued)

FOREIGN PATENT DOCUMENTS

CN 1413012 A 4/2003
CN 102095511 A 6/2011
(Continued)

OTHER PUBLICATIONS

German-language European Search Report issued in counterpart European Application No. 17203567.7 dated May 22, 2018 with partial English translation (eight pages).
(Continued)

*Primary Examiner* — Ajibola A Akinyemi
(74) *Attorney, Agent, or Firm* — Crowell & Moring LLP

(57) ABSTRACT

A method for operating a wireless transmitter and a wireless receiver, wherein the wireless transmitter is assigned to a tool and is adapted to detect an operation condition of the tool and to send an operation condition signal as a function of the detected operation condition. The wireless receiver is assigned to an apparatus and is adapted to receive the sent operation condition signal and to control an operation condition of the apparatus as a function of the received operation condition signal. The method assigns the wireless transmitter and the wireless receiver by a user-operated, electric assignment apparatus such that the receiver controls the operation condition of the apparatus as a function of the received operation condition signal. The assignment apparatus is separate from the transmitter and the receiver.

18 Claims, 2 Drawing Sheets

(51) Int. Cl.
  *B23Q 11/00* (2006.01)
  *A47L 7/00* (2006.01)
  *H04B 1/02* (2006.01)
  *H04B 1/06* (2006.01)
  *A47L 9/28* (2006.01)

(52) U.S. Cl.
  CPC ............... *G08C 17/02* (2013.01); *H04B 1/02* (2013.01); *H04B 1/06* (2013.01); *A47L 9/2894* (2013.01); *G08C 2201/20* (2013.01); *G08C 2201/93* (2013.01)

(58) Field of Classification Search
  USPC ........................................................ 455/67.7
  See application file for complete search history.

(56) References Cited

U.S. PATENT DOCUMENTS

| | | |
|---|---|---|
| 2008/0022479 A1 | 1/2008 | Zhao |
| 2009/0241283 A1 | 10/2009 | Loveless et al. |
| 2010/0199453 A1 | 8/2010 | Brotto et al. |
| 2013/0120112 A1* | 5/2013 | Zhao ..................... G08C 17/00 340/5.64 |
| 2016/0100724 A1 | 4/2016 | Valentini |
| 2016/0151846 A1 | 6/2016 | Suzuki |
| 2016/0175895 A1 | 6/2016 | Suzuki |
| 2017/0090499 A1 | 3/2017 | Dolan |
| 2017/0127501 A1 | 5/2017 | Isaacs et al. |
| 2019/0369283 A1* | 12/2019 | Hanson ..................... G01V 3/12 |

FOREIGN PATENT DOCUMENTS

| | | |
|---|---|---|
| DE | 10 2010 040 336 A1 | 3/2012 |
| DE | 10 2012 003 073 A1 | 8/2013 |
| DE | 10 2012 003 077 A1 | 8/2013 |
| DE | 10 2013 222 313 A1 | 5/2015 |
| DE | 10 2014 012 517 A1 | 8/2015 |
| DE | 10 2015 016 286 A1 | 6/2016 |
| EP | 2 628 431 B1 | 10/2018 |
| JP | 2004-195565 A | 7/2004 |
| JP | 2008036723 A | 2/2008 |
| WO | WO 2018/162233 A1 | 9/2018 |

OTHER PUBLICATIONS

Chinese-language Office Action issued in Chinese Application No. 201811406428.0 dated Jun. 2, 2021 (nine (9) pages).

* cited by examiner

METHOD FOR OPERATING A WIRELESS TRANSMITTER AND A WIRELESS RECEIVER, AND SYSTEM

CROSS REFERENCE TO RELATED APPLICATION

This application claims priority under 35 U.S.C. § 119 from European Patent Application No. 17203567.7, filed Nov. 24, 2017, the entire disclosure of which is herein expressly incorporated by reference.

BACKGROUND AND SUMMARY OF THE INVENTION

The invention relates to a method for operating a wireless transmitter and a wireless receiver, and to a system.

A method for operating a wireless transmitter and a wireless receiver and a system are known.

The invention is based on the object of providing a method for operating a wireless transmitter and a wireless receiver and a system, each of which has improved properties, in particular is cost-effective and user-friendly.

The invention achieves this object by providing a method and a system according to claimed embodiments of the invention. Advantageous developments and/or configurations of the invention are described and claimed herein.

The method according to the invention is configured to operate a wireless transmitter and a wireless receiver. The wireless transmitter is assigned to a tool and is adapted to detect an operation condition of the tool, in particular automatically, and to send an operation condition signal, in particular automatically, as a function of the detected operation condition. The wireless receiver is assigned to an apparatus and is adapted to receive the sent operation condition signal, in particular automatically, and to control an operation condition of the apparatus, in particular automatically, as a function of the received operation condition signal. The method comprises the step: assigning the wireless transmitter and the wireless receiver by way of a user-operated, electric assignment apparatus such that the receiver controls the operation condition of the apparatus as a function of the received operation condition signal. The assignment apparatus is separate from the transmitter and the receiver.

The method enables cost-effective assignment. The wireless transmitter and the wireless receiver do not need to have a user-operated, electric assignment apparatus for assignment. In particular, not only the transmitter and the receiver but also at least one further transmitter and/or at least one further receiver can each be assigned using the assignment apparatus, in particular the single assignment apparatus. The method also enables user-friendly assignment using the assignment apparatus.

If the wireless transmitter and the wireless receiver are assigned, the transmitter can be configured to detect the operation condition of the tool and to send the operation condition signal as a function of the detected operation condition. Additionally or alternatively, the receiver can be configured to receive the sent operation condition signal and to control the operation condition of the apparatus as a function of the received operation condition signal. In other words: if the transmitter and the receiver are assigned, the operation condition of the tool can control the operation condition of the apparatus. In other words: if the transmitter and the receiver are assigned, the operation condition of the apparatus may be dependent on the operation condition of the tool. If, in contrast, the transmitter and the receiver are not assigned, the operation condition of the apparatus may be independent of the operation condition of the tool. In other words: if the transmitter and the receiver are not assigned, the receiver does not need to control the operation condition of the apparatus, in particular irrespective of the operation condition signal being received. The assignment can be referred to as grouping or coupling. The assignment apparatus may be referred to as a grouping apparatus or coupling apparatus or operating apparatus.

A plurality of wireless receivers, in particular at least two, in particular at least five, in particular at least ten, may be or may have been assigned to the wireless transmitter. Additionally or alternatively, a plurality of wireless transmitters, in particular at least two, in particular at least five, in particular at least ten, may be or may have been assigned to the wireless receiver.

A wireless transmitter can mean that the operation condition signal can be sent in a wireless or cordless manner. A wireless receiver can mean that the operation condition signal can be received in a wireless manner.

Separate from the transmitter and the receiver can mean that the user-operated, electric assignment apparatus can be independent and/or autonomous. In particular, the assignment apparatus can be separate from the tool and/or the apparatus.

The tool may be a user-operated and/or hand-operated, in particular handheld, tool. The tool may be a garden and/or forest treatment apparatus. The tool may be a hand tool or a construction machine or a machine for a tradesman.

The apparatus may be different or separate from the tool. In particular, the apparatus may be a different type or may have a different design from the tool. The apparatus may be an auxiliary apparatus. In particular, the apparatus may be configured to perform a different task than the tool, in particular an auxiliary task. The apparatus may be a hand-operated, in particular handheld, apparatus.

The wireless transmitter can send the operation condition signal directly or indirectly, in particular by way of the user-operated, electric assignment apparatus. The wireless receiver can receive the operation condition signal directly or indirectly, in particular by way of the assignment apparatus.

The operation condition signal may be a signal specific to the operation condition and/or may describe or characterize the detected operation condition of the tool.

In one development of the invention, the user-operated, electric assignment apparatus is a smartwatch, a smartphone, a tablet, a laptop or a computer device. A smartwatch, a smartphone, a tablet, a laptop or a computer device typically has a user-friendly output device, in particular a display, and/or a user-friendly input device, in particular a keyboard, a mouse, and/or a user-friendly combined output/input device, in particular a touchscreen. The assignment apparatus therefore enables particularly user-friendly assignment.

In one development of the invention, the user-operated, electric assignment apparatus is a wireless assignment apparatus and is configured to assign the wireless transmitter and the wireless receiver in a wireless manner. The assigning is a wireless assignment procedure. This enables particularly user-friendly assignment. In particular, there is no need to establish a wire connection for assignment. A wireless assignment apparatus can mean that the assignment apparatus can be configured to send and/or receive in a wireless manner. The smartwatch or the smartphone, the tablet, the laptop, the computer device, if present, can typically be the wireless assignment apparatus.

In one development of the invention, the wireless transmitter has a transmitter identification and is adapted to send the transmitter identification, in particular together with the operation condition signal. During the assignment procedure, the transmitter identification is assigned to the wireless receiver by way of the user-operated, electric assignment apparatus. Additionally or alternatively, the wireless receiver has a receiver identification. The wireless transmitter is adapted to send the receiver identification, in particular together with the operation condition signal. During the assignment procedure, the receiver identification is assigned to the wireless transmitter by way of the user-operated, electric assignment apparatus. This makes it possible to distinguish the transmitter from a further, in particular unassigned, transmitter and/or to distinguish the receiver from a further, in particular unassigned, receiver. In particular, the transmitter identification and/or the receiver identification can each be individual or unique, in particular one-off. The assignment can be carried out by storing the transmitter identification in the receiver and/or in the assignment apparatus and/or by storing the receiver identification in the transmitter and/or in the assignment apparatus.

In one development of the invention, the operation condition of the tool is an on-condition, in particular a control condition, or an off-condition. Additionally or alternatively, the operation condition of the apparatus is an on-condition, in particular a control condition, or an off-condition. The control condition of the tool may be an energy-usage control condition or an energy-consumption control condition and/or a speed control condition. The control condition of the apparatus may be an energy-usage control condition and/or a speed control condition. The operation condition signal may have the on-condition or the off-condition of the tool. In other words: the operation condition signal may be different for the on-condition and for the off-condition. Alternatively, the wireless transmitter can be configured to send the operation condition signal in the on-condition of the tool and to not send an operation condition signal in the off-condition.

In one development of the invention, the tool is a grinding machine, a cutoff grinder, an angular grinder, a saw, a circular saw, a jigsaw, a pole pruner, hedge shears, a hedge cutter, a blower device, a leaf blower, a lawn mower, a brush cutter, a sweeper device, a sweeper roller, a sweeper brush, a drilling machine, a percussion drilling machine, a milling machine, a planing machine or a polishing machine. During operation of such a tool, the latter can produce and/or swirl up waste and/or dirt, in particular dust, sawdust, leaves and/or grass. Additionally or alternatively, such a tool can consume consumables, in particular lubricating oil, during its operation and/or can heat up.

In one development of the invention, the apparatus is a suction device, a supply device for lubricant, a supply device for coolant, and/or a supply device for medium and/or a valve. In particular, the suction device may be a vacuum cleaner and/or a leaf vacuum. The supply device for lubricant and/or the supply device for coolant may be an oil supply device and/or a water supply device. The supply device for medium may be configured to supply the tool with a medium, in particular water, for binding, in particular dust. The supply device for medium can be referred to as a supply device for binder. The valve may be configured to enable or block, in particular control, a flow of a medium, in particular water or gas, in particular compressed air, or hydraulic fluid. The valve may be a solenoid valve.

The invention also relates to a system. The system according to the invention comprises the wireless transmitter which is adapted to be assigned to the tool and to detect the operation condition of the tool and to send the operation condition signal as a function of the detected operation condition. The system also comprises the wireless receiver which is adapted to be assigned to the apparatus and to receive the sent operation condition signal and to control the operation condition of the apparatus as a function of the received operation condition signal. The wireless transmitter and the wireless receiver are configured to have been or be assigned by way of the user-operated, electric assignment apparatus such that the receiver controls the operation condition of the apparatus as a function of the received operation condition signal. The assignment apparatus is separate from the transmitter and the receiver.

The system can enable the same advantages as the method described above. In particular, the wireless transmitter and the wireless receiver can each be partially or even completely configured in the manner described above for the method. Furthermore, the system can be configured to carry out parts of the method described above or even the entire method.

In one development of the invention, the wireless transmitter is a radio transmitter and the wireless receiver is a radio receiver. In addition, the user-operated, electric assignment apparatus may be a radio apparatus. In particular, the radio transmitter and/or the radio apparatus can be configured to send a radio signal. The radio receiver and/or the radio apparatus may be configured to receive a radio signal. The radio signal may be a Bluetooth radio signal or a WLAN or WiFi radio signal.

In one development of the invention, the wireless transmitter is separate from the tool and designed to be coupled to the tool, in particular mechanically. Additionally or alternatively, the wireless receiver is separate from the apparatus and designed to be coupled to the apparatus, in particular mechanically. This enables retrofitting to an existing tool and/or an existing apparatus. In particular, coupling may be or may have been effected using a form-fitting connection such as a screw connection, a latching connection, a force-fitting connection and/or an integral connection such as an adhesively bonded connection. Alternatively, the transmitter can be integrated in the tool, in particular ex-works. Further alternatively, the receiver can be integrated in the apparatus, in particular ex-works.

In one development of the invention, the wireless transmitter includes a sensor. The sensor is configured to detect the operation condition of the tool irrespective of whether the tool is driven by way of an electric motor or by way of a combustion engine. In particular, the sensor can be configured to detect an operation condition of the engine/motor and therefore the operation condition of the tool.

In one development of the invention, the transmitter includes a sensor in the form of an acoustic sensor, in the form of an inductive sensor, in the form of a vibration sensor or in the form of an acceleration sensor for detecting the operation condition of the tool. The acoustic sensor can be used to detect noises which are typically produced during operation of the tool. The inductive sensor can be used to detect changing electromagnetic and/or magnetic fields which are typically produced during operation of the tool by stray fields of the electric motor, ignition pulses of the combustion engine, current changes, moving magnets in a flywheel of the tool or of a generator, if present. The vibration sensor or the acceleration sensor can be used to detect vibrations which are typically produced during operation of the tool. The operation condition can therefore be detected, in particular independently of a drive motor type driving the tool.

In one development of the invention, the wireless receiver is an adaptor. The adaptor is configured for arrangement between the apparatus and a supply feeding unit for the apparatus. The adaptor is also configured to control or regulate feeding supply from the supply feeding unit for controlling the operation condition of the apparatus. The supply feeding unit may be an electrical energy source, in particular a socket. The adaptor can be referred to as a socket adaptor. The supply feeding unit can be a fluid source, in particular a water connection. The adaptor can be referred to as a water connection adaptor. The supply feeding unit may be a gas source, in particular a compressed air connection. The adaptor can be referred to as a compressed air connection adaptor. The supply feeding unit may be a hydraulic source, in particular a hydraulic connection. The adaptor can be referred to as a hydraulic connection adaptor.

In one development of the invention, the system comprises the user-operated, electric assignment apparatus. In particular, the assignment apparatus can be partially or even completely configured in the manner described above for the method.

In one development of the invention, the system comprises the tool and/or the apparatus. In particular, the tool and/or the apparatus can each be partially or even completely configured in the manner described above for the method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
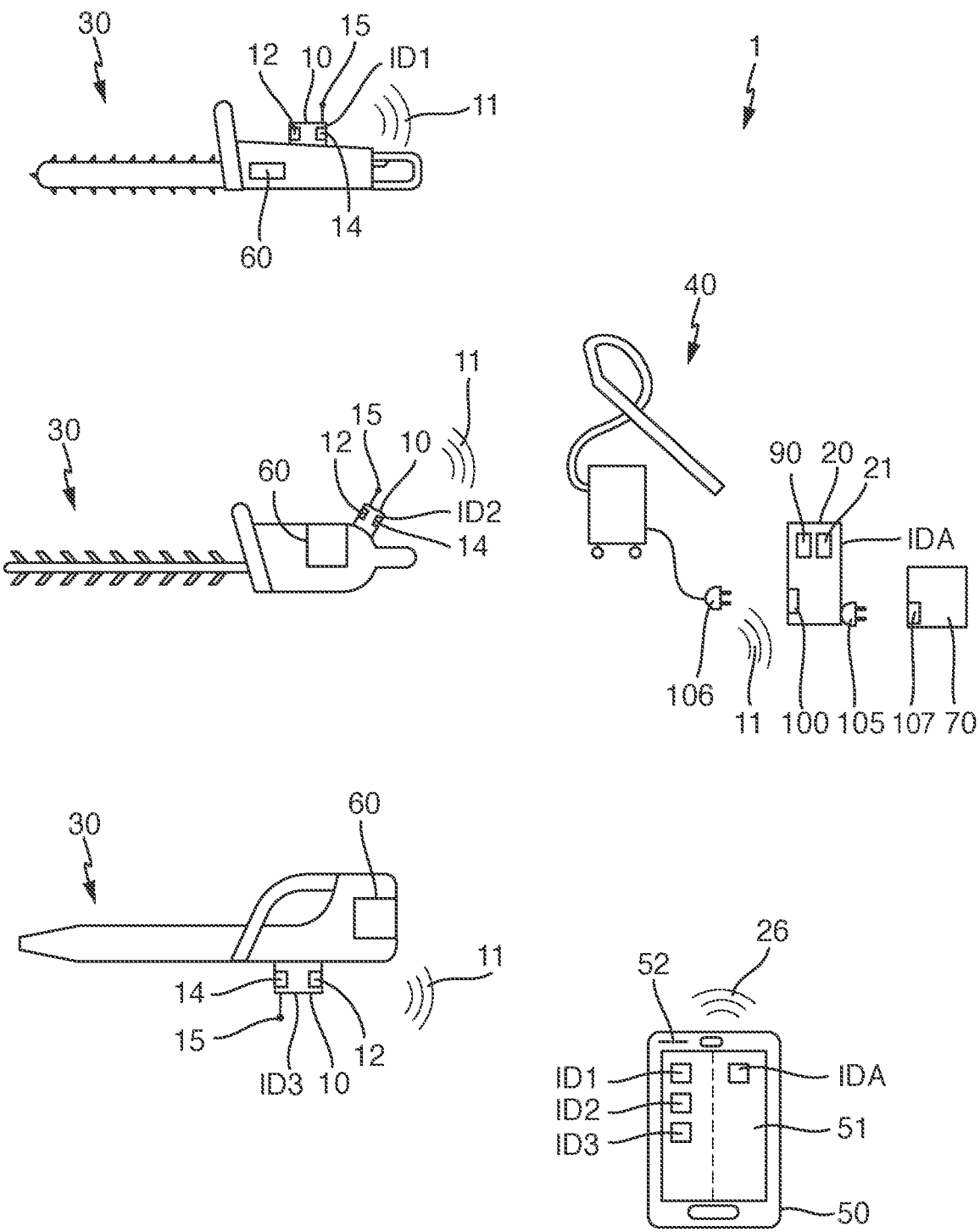
FIG. 1 shows an exemplary system according to the invention for carrying out an exemplary method according to the invention.
Figure 2:
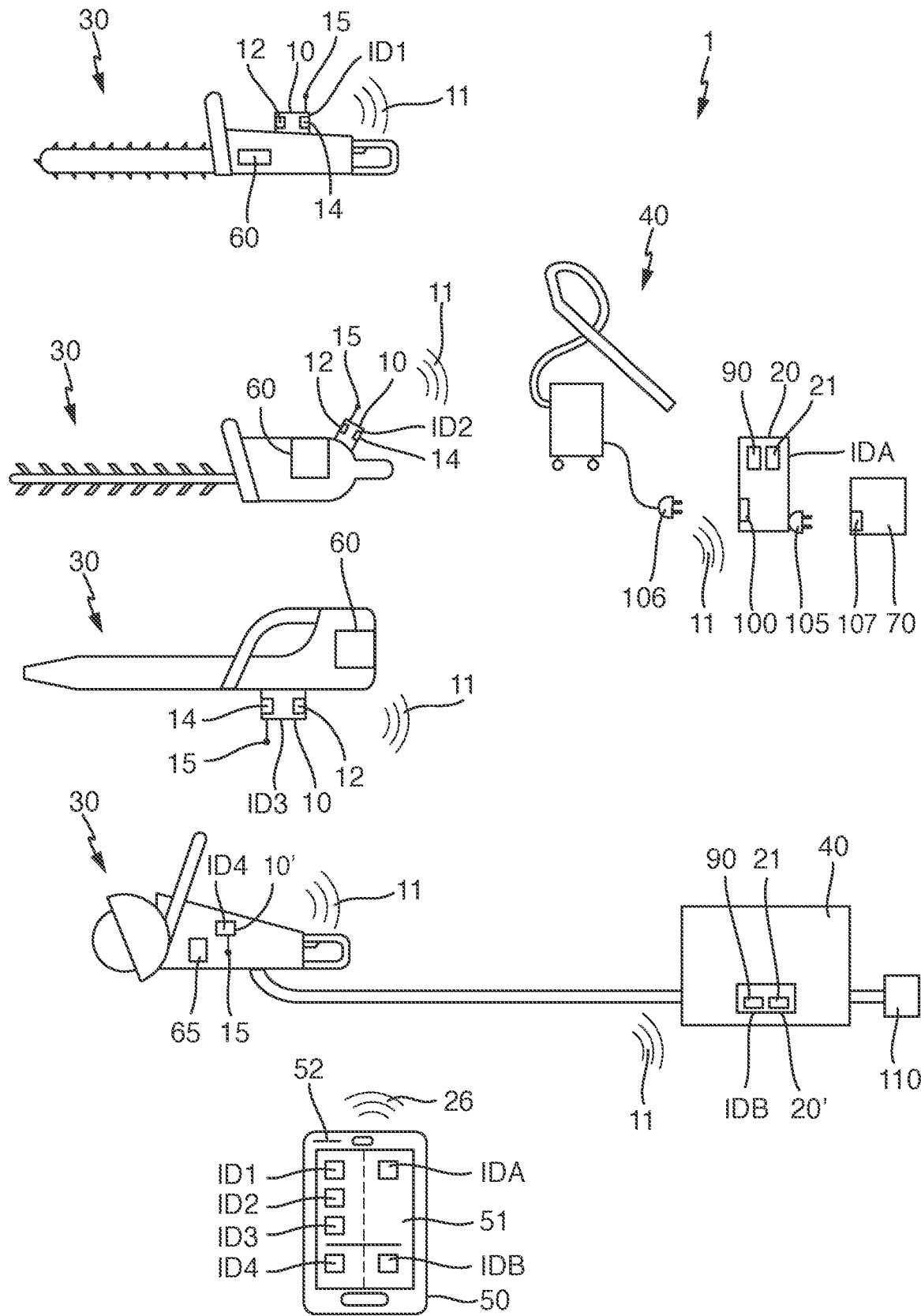
FIG. 2 shows the system from FIG. 1 having a further transmitter and a further receiver.

FIGS. 1 and 2 show a system 1. The system 1 has a wireless transmitter 10, 10' which is adapted to be assigned to a tool 30 and to detect an operation condition of the tool 30 and to send an operation condition signal 11 as a function of the detected operation condition. The system 1 also has a wireless receiver 20, 20' which is adapted to be assigned to an apparatus 40 and to receive the sent operation condition signal 11 and to control an operation condition of the apparatus 40 as a function of the received operation condition signal 11. The wireless transmitter 10, 10' and the wireless receiver 20, 20' are configured to have been or be assigned by way of a user-operated, electric assignment apparatus 50 such that the receiver 20, 20' controls the operation condition of the apparatus 40 as a function of the received operation condition signal 11. The assignment apparatus 50 is separate from the transmitter 10, 10' and the receiver 20, 20'.

In the exemplary embodiment shown, the system 1 has the user-operated, electric assignment apparatus 50.

Furthermore, in the exemplary embodiment shown, the system 1 has the tool 30 and the apparatus 40.

The system 1 is configured to carry out a method.

The method is configured to operate the wireless transmitter 10, 10' and the wireless receiver 20, 20'. The wireless transmitter 10, 10' is assigned to the tool 30 and is adapted to detect the operation condition of the tool 30 and to send an operation condition signal 11 as a function of the detected operation condition. The wireless receiver 20, 20' is assigned to the apparatus 40 and is adapted to receive the sent operation condition signal 11 and to control the operation condition of the apparatus 40 as a function of the received operation condition signal 11. The method has the step of: assigning the wireless transmitter 10, 10' and the wireless receiver 20, 20' by way of the user-operated, electric assignment apparatus 50 such that the receiver 20, 20' controls the operation condition of the apparatus 40 as a function of the received operation condition signal 11. The assignment apparatus 50 is separate from the transmitter 10, 10' and the receiver 20, 20'.

In FIG. 1, the system 1 has three transmitters 10 and one receiver 20. Furthermore, the system 1 has three tools 30 in the form of a saw, in particular a chainsaw, hedge shears and a blower device and the one apparatus 40 in the form of a suction device. In FIG. 2, the system 1 additionally has a further transmitter 10' and a further receiver 20'. The system 1 additionally has a further tool 30 in the form of a cutoff grinder and a further apparatus 40 in the form of a valve. The plurality of transmitters 10, 10' and the plurality of receivers 20, 20' can be assigned by way of the assignment apparatus 50, in particular the single assignment apparatus.

In detail, the user-operated, electric assignment apparatus 50 is a wireless assignment apparatus in the form of a smartphone with a touchscreen 51. The wireless assignment apparatus 50 is configured to assign the wireless transmitter(s) 10, 10' and the wireless receiver(s) 20, 20' in a wireless manner. The assignment is a wireless assignment procedure.

The wireless transmitter 10, 10' is a radio transmitter in the form of a Bluetooth radio transmitter. The wireless receiver 20, 20' is a radio receiver in the form of a Bluetooth radio receiver. Furthermore, the operation condition signal 11 is a radio signal in the form of a Bluetooth radio signal. In addition, the assignment apparatus 50 is a radio apparatus in the form of a Bluetooth radio apparatus.

In detail, the radio transmitter 10, 10' has an antenna 15 for sending the operation condition signal 11. The radio receiver 20, 20' has an antenna 21 for receiving the operation condition signal 11. In addition, the assignment apparatus 50 has an antenna 52 for sending and/or receiving.

Each wireless transmitter 10, 10' has a transmitter identification ID1, ID2, ID3, ID4, in particular an individual transmitter identification, and is adapted to send the transmitter identification ID1, ID2, ID3, ID4, in particular together with the operation condition signal 11. During assignment, the transmitter identification ID1, ID2, ID3, ID4 is assigned to the corresponding wireless receiver 20, 20' by way of the user-operated, electric assignment apparatus 50. In the exemplary embodiment shown, the respective transmitter identification ID1, ID2, ID3, ID4 is additionally arranged on the respective transmitter 10, 10' in a user-readable manner.

Each wireless receiver 20, 20' has a receiver identification IDA, IDB, in particular an individual receiver identification. During assignment, the receiver identification IDA, IDB is assigned to the wireless transmitter 10, 10' by way of the user-operated, electric assignment apparatus 50. In alternative exemplary embodiments, the wireless transmitter can be additionally adapted to send the receiver identification, in particular together with the operation condition signal.

In the exemplary embodiment shown, the respective receiver identification IDA, IDB is arranged on the respective receiver 20, 20' in a user-readable manner. Additionally or alternatively, the wireless receiver 20, 20' is configured to send its receiver identification IDA, IDB, in particular as a radio signal, in particular as a Bluetooth radio signal, in particular in a so-called slave mode.

The user-operated, electric assignment apparatus 50 is configured to receive the sent transmitter identification(s) ID1, ID2, ID3, ID4 and the sent receiver identification(s) IDA, IDB. The transmitter identification(s) ID1, ID2, ID3, ID4 and the receiver identification(s) IDA, IDB received by the assignment apparatus 50 are output, in particular are displayed on the touchscreen 51, in particular in a list. The user can use the assignment apparatus 50 to assign the transmitter identification(s) ID1, ID2, ID3, ID4 to the corresponding receiver identification IDA, IDB, in particular by pushing them together on the touchscreen 51 to form a respective group. Consequently, the user-operated, electric assignment apparatus 50 sends a configuration signal 26.

In the exemplary embodiment shown, the three transmitters 10 or their transmitter identifications ID1, ID2, ID3 are intended to be assigned to the receiver 20 or its receiver identification IDA. The transmitter 10' or its transmitter identification ID4 is intended to be assigned to the receiver 20' or its receiver identification IDB. Accordingly, the configuration signal 26 has the receiver identification IDA and the transmitter identifications ID1, ID2, ID3 to be assigned. Furthermore, the configuration signal 26 has, in particular separate therefrom, the receiver identification IDB and the transmitter identification ID4 to be assigned.

The configuration signal 26 is received by the receiver(s) 20, 20', in particular in the slave mode. The receiver 20 with the receiver identification IDA stores the received transmitter identifications ID1, ID2, ID3 in a memory 90. The receiver 20' with the receiver identification IDB stores the received transmitter identification ID4 in its memory 90.

The three transmitters 10 or their transmitter identifications ID1, ID2, ID3 are therefore assigned to the receiver 20 or its receiver identification IDA. The transmitter 10' or its transmitter identification ID4 is assigned to the receiver 20' or its receiver identification IDB.

As described above, in alternative exemplary embodiments, the wireless transmitter can be adapted to send the receiver identification. The configuration signal can be received by the transmitter(s) and the receiver identification can be stored.

Furthermore, in alternative exemplary embodiments, the assignment apparatus can be configured to store the assignment. The assignment apparatus does not need to send a configuration signal. During operation, the transmitter can send its transmitter identification, the assignment apparatus can receive this transmitter identification and can send the assigned receiver identification.

If the wireless transmitter 10, 10' and the wireless receiver 20, 20' are assigned, the transmitter 10, 10' is configured to detect the operation condition of the tool 30 and to send the operation condition signal 11 as a function of the detected operation condition. The receiver 20, 20', in particular in a master mode, is configured to receive the sent operation condition signal 11 and to control the operation condition of the apparatus 40 as a function of the received operation condition signal 11.

In detail, each wireless transmitter 10, 10' is configured to send its transmitter identification ID1 or ID2 or ID3 or ID4 with the operation condition signal 11. Each receiver 20, 20', in particular in the master mode, is configured to receive the operation condition signal 11 with the transmitter identification. The receiver 20, 20' compares the received transmitter identifications with the transmitter identification(s) stored in the memory 90. If the received transmitter identification matches a stored transmitter identification ID1, ID2, ID3 or ID4, the receiver 20, 20' controls the operation condition of the apparatus 40 as a function of the received operation condition signal 11. If there is no match, the receiver 20, 20' does not control the operation condition. The individual transmitter identifications ID1, ID2, ID3, ID4 make it possible for the receiver(s) 20, 20' to respectively distinguish between an operation condition signal 11 from an assigned transmitter 10, 10' and an operation condition signal from a transmitter 10', 10 which has not been assigned.

Furthermore, the wireless transmitter 10 is separate from the tool 30 and can be coupled to the tool 30 or, in the exemplary embodiment shown, is coupled to the tool 30, as can be seen in FIG. 1. The wireless transmitter 10 additionally has an energy source 14 in the form of a battery which supplies the transmitter 10, in particular, with electrical energy.

In contrast to this, the wireless transmitter 10' is integrated in the tool 30, as can be seen at the bottom of FIG. 2.

In addition, the wireless receiver 20 is separate from the apparatus 40 and can be coupled to the apparatus 40, as can be seen in FIG. 1.

In contrast to this, the wireless receiver 20' is integrated in the apparatus 40, as can be seen at the bottom of FIG. 2.

In addition, the tool 30 has an electric motor 60, as can be seen in FIG. 1, or a combustion engine 65, as can be seen at the bottom of FIG. 2. The electric motor 60 and the combustion engine 65 are each configured to drive the tool 30.

The operation condition of the tool 30 or its motor/engine is an on-condition, in particular a control condition of a controllable speed, or an off-condition.

The wireless transmitter 10 also has a sensor 12, in particular in the form of an inductive sensor. The sensor 12 is configured to detect the operation condition of the tool 30 or its motor/engine irrespective of whether the tool 30 is driven by means of the electric motor 60 or the combustion engine 65.

The operation condition of apparatus 40 is an on-condition, in particular a control condition, or an off-condition. In particular, the control condition is a controllable power consumption for the apparatus 40 in the form of the suction device. For the apparatus 40 in the form of the valve, the control condition is a controllable flow rate, in particular of water from a water connection 110.

In addition, the wireless receiver 20 is an adaptor. The adaptor is configured for arrangement between the apparatus 40 and a supply feeding unit 70 for the apparatus 40. The receiver 20 is also configured to control supply feed from the supply feeding unit 70 for the purpose of controlling the operation condition of the apparatus 40.

In the exemplary embodiment shown, the supply feeding unit 70 is an electrical energy source in the form of a socket. The receiver 20 has a mains plug 105 for insertion into a socket 107 of the supply feeding unit 70. If the mains plug 105 has been inserted into the socket 107, the receiver 20 is supplied with electrical energy by the supply feeding unit 70. In alternative exemplary embodiments, the receiver may have an energy source, in particular a battery, which can supply the receiver with electrical energy. In the exemplary embodiment shown, the receiver 20 has a socket 100, into which a mains plug 106 of the apparatus 40 may have been or may be inserted.

Furthermore, in the exemplary embodiment shown, the wireless transmitter 10, 10' sends the following operation condition signal 11 at regular intervals, such as one second: the transmitter identification ID1 or ID2 or ID3 or ID4 and an operating period, in particular in seconds, of the corresponding tool 30. If the tool 30 is in its on-condition, the transmitter 10, 10' accordingly increases, in particular automatically, the detected operating period of the tool 30. In the off-condition, the operating period remains unchanged. The wireless receiver 20, 20' receives the operation condition signal 11. If the operating period has been increased for the assigned transmitter identification, the receiver 20 controls the apparatus 40 into its on-condition. If the operating period is unchanged, the apparatus 40 remains or is switched off. If the wireless receiver 20, 20' does not receive an operation condition signal, such as when a transmitter is out of range, the apparatus 40 remains or is switched off.

In alternative exemplary embodiments, the operation condition signal may have the on-condition, in particular the control condition, or the off-condition of the tool. Furthermore, in alternative exemplary embodiments, the wireless transmitter can be configured to send the operation condition signal, in particular only its transmitter identification, in the on-condition of the tool and to not send an operation condition signal in the off-condition.

As the exemplary embodiments shown and explained above make clear, the invention provides an advantageous method for operating a wireless transmitter and a wireless receiver and an advantageous system, each of which has improved properties, in particular is cost-effective and user-friendly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a wireless transmitter and a wireless receiver,
    wherein the wireless transmitter is assigned to a tool and is adapted to detect an operation condition of the tool and to send an operation condition signal as a function of the detected operation condition, and
    wherein the wireless receiver is assigned to an apparatus and is adapted to receive the sent operation condition signal and to control an operation condition of the apparatus as a function of the received operation condition signal,
    the method comprising the steps of:
        assigning the wireless transmitter and the wireless receiver by way of a user-operated, electric assignment apparatus such that the receiver controls the operation condition of the apparatus as a function of the received operation condition signal,
        wherein the assignment apparatus is separate from the transmitter and the receiver,
        and further wherein:
            the wireless transmitter has a transmitter identification and is adapted to send the transmitter identification, and wherein during the assignment procedure the transmitter identification is assigned to the wireless receiver by the user-operated, electric assignment apparatus, and/or
            the wireless receiver has a receiver identification, and wherein the wireless transmitter is adapted to send the receiver identification, and wherein during the assignment procedure the receiver identification is assigned to the wireless transmitter by the user-operated, electric assignment apparatus.

2. The method according to claim 1, wherein
    the user-operated, electric assignment apparatus is a smartwatch, a smartphone, a tablet, a laptop or a computer device.

3. The method according to claim 2, wherein
    the tool is a grinding machine, a cutoff grinder, an angular grinder, a saw, a circular saw, a jigsaw, a pole pruner, hedge shears, a hedge cutter, a blower device, a leaf blower, a lawn mower, a brush cutter, a sweeper device, a sweeper roller, a sweeper brush, a drilling machine, a percussion drilling machine, a milling machine, a planing machine or a polishing machine.

4. The method according to claim 3, wherein
    the apparatus is a suction device, a supply device for lubricant, a supply device for coolant, a supply device for medium and/or a valve.

5. The method according to claim 4, wherein
    the user-operated, electric assignment apparatus is a wireless assignment apparatus and is configured to assign the wireless transmitter and the wireless receiver in a wireless manner, and
    the assigning is a wireless assignment procedure.

6. The method according to claim 1, wherein
    the tool is a grinding machine, a cutoff grinder, an angular grinder, a saw, a circular saw, a jigsaw, a pole pruner, hedge shears, a hedge cutter, a blower device, a leaf blower, a lawn mower, a brush cutter, a sweeper device, a sweeper roller, a sweeper brush, a drilling machine, a percussion drilling machine, a milling machine, a planing machine or a polishing machine.

7. A method for operating a wireless transmitter and a wireless receiver,
    wherein the wireless transmitter is assigned to a tool and is adapted to detect an operation condition of the tool and to send an operation condition signal as a function of the detected operation condition, and
    wherein the wireless receiver is assigned to an apparatus and is adapted to receive the sent operation condition signal and to control an operation condition of the apparatus as a function of the received operation condition signal,
    the method comprising the steps of:
        assigning the wireless transmitter and the wireless receiver by way of a user-operated, electric assignment apparatus such that the receiver controls the operation condition of the apparatus as a function of the received operation condition signal,
        wherein the assignment apparatus is separate from the transmitter and the receiver,
        and further wherein:
            the operation condition of the tool is an on-condition, a control condition, or an off-condition, and/or
            the operation condition of the apparatus is an on-condition, a control condition, or an off-condition.

8. A method for operating a wireless transmitter and a wireless receiver,
    wherein the wireless transmitter is assigned to a tool and is adapted to detect an operation condition of the tool and to send an operation condition signal as a function of the detected operation condition, and wherein the wireless receiver is assigned to an apparatus and is adapted to receive the sent operation condition signal and to control an operation condition of the apparatus as a function of the received operation condition signal, the method comprising the steps of:

assigning the wireless transmitter and the wireless receiver by way of a user-operated, electric assignment apparatus such that the receiver controls the operation condition of the apparatus as a function of the received operation condition signal, wherein the assignment apparatus is separate from the transmitter and the receiver, and the apparatus is a suction device, a supply device for lubricant, a supply device for coolant, a supply device for medium and/or a valve.

9. A system, comprising:

a wireless transmitter which is adapted to be assigned to a tool and to detect an operation condition of the tool and to send an operation condition signal as a function of the detected operation condition; and a wireless receiver which is adapted to be assigned to an apparatus and to receive the sent operation condition signal and to control an operation condition of the apparatus as a function of the received operation condition signal; and wherein the wireless transmitter and the wireless receiver are configured to be assigned by a user-operated, electric assignment apparatus such that the receiver controls the operation condition of the apparatus as a function of the received operation condition signal, wherein the assignment apparatus is separate from the transmitter and the receiver, and further wherein:

the wireless transmitter has a transmitter identification and is adapted to send the transmitter identification, and wherein during the assignment procedure the transmitter identification is assigned to the wireless receiver by the user-operated, electric assignment apparatus, and/or the wireless receiver has a receiver identification, and wherein the wireless transmitter is adapted to send the receiver identification, and wherein during the assignment procedure the receiver identification is assigned to the wireless transmitter by the user-operated, electric assignment apparatus.

10. The system according to claim 9, wherein
the wireless transmitter is a radio transmitter and the wireless receiver is a radio receiver.

11. The system according to claim 9, wherein
the wireless transmitter is separate from the tool and designed to be coupled to the tool, and/or
the wireless receiver is separate from the apparatus and designed to be coupled to the apparatus.

12. The system according to claim 9, wherein
the wireless transmitter includes a sensor which is configured to detect the operation condition of the tool irrespective of whether the tool is driven by an electric motor or by a combustion engine.

13. The system according to claim 9, wherein
the transmitter includes a sensor in the form of an acoustic sensor, in form of an inductive sensor, in the form of a vibration sensor, or in the form of an acceleration sensor for detecting the operation condition of the tool.

14. The system according to claim 9, wherein
the wireless receiver is an adaptor which is configured for arrangement between the apparatus and a supply feeding unit for the apparatus and is configured to control feeding supply from the supply feeding unit for controlling the operation condition of the apparatus.

15. The system according to claim 9, the system further comprising:
the user-operated, electric assignment apparatus.

16. The system according to claim 9, the system further comprising:
the tool and/or the apparatus.

17. A system, comprising:

a wireless transmitter which is adapted to be assigned to a tool and to detect an operation condition of the tool and to send an operation condition signal as a function of the detected operation condition; and a wireless receiver which is adapted to be assigned to an apparatus and to receive the sent operation condition signal and to control an operation condition of the apparatus as a function of the received operation condition signal; and wherein the wireless transmitter and the wireless receiver are configured to be assigned by a user-operated, electric assignment apparatus such that the receiver controls the operation condition of the apparatus as a function of the received operation condition signal, wherein the assignment apparatus is separate from the transmitter and the receiver, and further wherein:

the operation condition of the tool is an on-condition, a control condition, or an off-condition, and/or the operation condition of the apparatus is an on-condition, a control condition, or an off-condition.

18. A system, comprising:

a wireless transmitter which is adapted to be assigned to a tool and to detect an operation condition of the tool and to send an operation condition signal as a function of the detected operation condition; and a wireless receiver which is adapted to be assigned to an apparatus and to receive the sent operation condition signal and to control an operation condition of the apparatus as a function of the received operation condition signal; and wherein the wireless transmitter and the wireless receiver are configured to be assigned by a user-operated, electric assignment apparatus such that the receiver controls the operation condition of the apparatus as a function of the received operation condition signal, wherein the assignment apparatus is separate from the transmitter and the receiver, and wherein the apparatus is a suction device, a supply device for lubricant, a supply device for coolant, a supply device for medium and/or a valve.

* * * * *